United States Patent Office 3,522,261
Patented July 28, 1970

3,522,261
ESTERS OF SULFONIC ACIDS CONTAINING QUATERNARY AMMONIUM GROUPS AND PROCESS FOR THE PREPARATION THEREOF
Calvin L. Stevens, Bloomfield Hills, Mich., Harry O. Michel, Towson, Md., Arthur B. Ash, Detroit, Mich., Joseph Epstein, Baltimore, Md., Peter Blumbergs, Oak Park, Mich., and Brennie E. Hackley, Jr., Joppa, Md.; said Stevens, said Ash, and said Blumbergs assignors to Ash Stevens, Inc., Detroit, Mich., a corporation of Michigan, and said Michel, said Epstein, and said Hackley assignors to the United States of America as represented by the Secretary of the Army
No Drawing. Original application Oct. 23, 1965, Ser. No. 504,175, now Patent No. 3,410,858, dated Nov. 12, 1968. Divided and this application Apr. 17, 1967, Ser. No. 645,081
Int. Cl. C07d 31/48; C07c 143/00
U.S. Cl. 260—294.8         17 Claims

ABSTRACT OF THE DISCLOSURE

The preparation of new compounds is described, salts of alkyl esters of organic sulfonic acids containing quaternary amine cationic groups. They are prepared by the reaction of a dialkyl sulfate with an amine-containing or quaternary amine salt-containing sulfonic acid, a sultane. The preparation of the aforementioned sulfonic acids is also described.

CROSS-REFERENCE TO RELATED APPLICATIONS

This is a division of application Ser. No. 504,175, filed Oct. 23, 1965, which has matured into Pat. No. 3,410,858 granted Nov. 12, 1968.

This invention relates to novel sulfonate compounds useful as chemical intermediates and to the process for the preparation thereof. More particularly, this invention relates to certain novel compounds, having the structural formula:

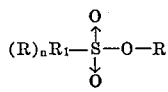

wherein R is a lower alkyl group, wherein $n$ is an integer between 0 and 3 and wherein $R_1(R)_n$ is an organic group containing a quaternary amine cationic group with the $(R)_n$ groups attached to the amine group in ionic association with an anionic group which is resistant to alkylation by the R group, whch are useful as alkylating agents and to the process for the preparation thereof.

Numerous compounds are known to the prior art as alkylating agents; however, it is not believed that any of the prior art alkylating agents are closely related structurally to the compounds of the present invention. The primary disadvantages of the prior art alkylating agents is that they are water insoluble, are difficult or hazardous to use, and/or require a basic reaction medium for alkylation reactions.

It is therefore an object of the present invention to resistant to alkylation by the R group, which are useful as reactive chemical intermediates and particularly useful as alkylating agents which are water soluble, highly reactive, and useful in acidic, neutral and in most instances, basic reaction mediums.

It is further an object of the present invention to provide a novel process for the preparation of such sulfonate compounds.

These and other objects will become increasingly apparent to those skilled in the art by reference to the following description.

The present invention relates to novel compounds of the structural formula:

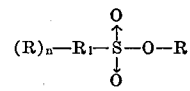

wherein R is a lower alkyl group, wherein $n$ is an integer between 0 and 3 and wherein $R_1(R)_n$ is an organic group containing a quaternary amine cationic group which can form part of an aryl or other cyclic group with the $(R)_n$ groups attached to the amine group in ionic association with an anionic group which is resistant to alkylation by the R group. The present invention further relates to certain preferred compounds of the structural formula:

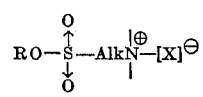

wherein

is a cationic quaternary amine group, wherein Alk is a lower alkylene group, wherein R is a lower alkyl group and wherein $X^\ominus$ is an anionic group which is resistant to alkylation by the R group.

The terms "lower alkylene" and "lower alkyl" as used in connection with the present invention means groups containing 1 to 8 carbon atoms which can be straight or branched chain and which can be unsubstituted or substituted with various groups such as halo, (including chloro, fluro, iodo and bromo groups) alkyl, aryl, nitro and other groups which do not interfere with the function of the compounds of the present invention as alkylating agents (i.e. are not themselves alkylatable).

In the compounds of the present invention, it is the R group that supplies the alkyl group when the compounds of the present invention are utilized as alkylating agents. Further discussion of the alkylating properties of the compounds of the present invention will be set forth hereinafter.

The function of $R_1(R)_n$ group in the compounds of the present invention used as alkylating agents is to render the R group active in alkylation and to provide other characteristics such as water solubility. The specific structure of the $R_1(R)_n$ group is not critical so long as it is an organic group containing a quaternary amine (ammonium) cationic group, in ionic association with an anionic group which is resistant to alkylation by the R group. It is preferred to have a separation of between 1 to 8 carbon atoms between the sulfur atom and the quaternary amine group in the sulfonate compounds of the present invention used as alkylating agents. The preferred quaternary ammonium group has the structural formula:

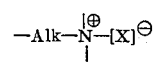

as discussed above for reasons of economy.

The

group in the sulfonate compounds of the present invention can be any cationic quaternary amine group. The structure of the

quaternary amine group is not critical and any such group is useful in the compounds of the present invention; however, for reasons of ease of preparation and economy

quaternary amine groups which are tri-lower alkyl groups are particularly preferred.

The sulfonate compounds within the scope of the present invention include for instance those with cationic groups such as those shown in Table I.

TABLE I $$(R)_nR_1-\overset{O}{\underset{O}{\overset{\uparrow}{S}}}-O-R$$

| | R | $(R)_nR_1$ |
|---|---|---|
| 1 | $CH_3-$ | $-(CH_2)_3-N^{\oplus}(CH_3)_3$ |
| 2 | $CH_3-$ | $-(CH_2)_3N^{\oplus}(C_2H_5)_3$ |
| 3 | $CH_3-$ | $-(CH_2)_3-N^{\oplus}\langle\text{pyridinyl}\rangle$ |
| 4 | $CH_3-$ | $-\overset{CH_3}{\underset{CH_3}{\overset{|}{C}}}-CH_2\overset{|}{\underset{CH_3}{C}}HN^{\oplus}(CH_3)_3$ |
| 5 | $CH_3-$ | $-\overset{CH_3}{\underset{CH_3CH_3}{\overset{|}{C}}}-CH_2CHN^{\oplus}\langle\text{pyridinyl}\rangle$ |
| 6 | $CH_3-$ | $-(CH_2)_4-N^{\oplus}(CH_3)_3$ |
| 7 | $CH_3-$ | $-(CH_2)_4-N^{\oplus}(C_2H_5)_3$ |
| 8 | $CH_3-$ | $-(CH_2)_4-N^{\oplus}\langle\text{pyridinyl}\rangle$ |
| 9 | $CH_3-$ | $-(CH_2)_2-N^{\oplus}(CH_3)_3$ |
| 10 | $CH_3-$ | $-(CH_2)_6N^{\oplus}(CH_3)_3$ |
| 11 | $CH_3-$ | $-(CH_3)_3CHN^{\oplus}\langle\text{pyridinyl}\rangle\text{-}CH_2\text{-}CH_3$ |
| 12 | $CH_3-$ | $-(CH_2)_3CHN^{\oplus}(CH_3)\text{-}CH_3$ |
| 13 | $CH_3-$ | $-\langle\text{N-pyridinium-CH}_3\rangle$ |
| 14 | $CH_3-$ | $-CH_2-N^{\oplus}(CH_5)_3$ |
| 15 | $C_8H_{24}-$ | $-CH_2-N^{\oplus}(C_2H_5)_3$ |
| 16 | $C_6H_{18}-$ | $-(CH_2)_2-N^{\oplus}(C_2H_5)_3$ |
| 17 | $CH_3-$ | $-(CH_2)_5-N^{\oplus}(C_8H_{25})_3$ |
| 18 | $CH_3-$ | $-(CH_2)_3-N^{\oplus}(C_8H_{25})_3$ |

As can be seen from the examples in Table I, the $R_1(R)_n$ cationic group can be selected from many different kinds of quaternary ammonium groups. However, $R_1(R)_n$ groups of the structural formula:

$$-AlkN^{\oplus}(CH_3)_3$$

and

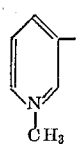

are especially preferred for the reasons of ease and economy of preparation.

The anionic group $X^{\ominus}$ is preferably selected from the group consisting of nitrate, perchlorate and various sulfate anions, although any anionic group $X^{\ominus}$ which is resistant to alkylation by the R group in the sulfonates of the present invention is satisfactory. The phrase "resistant to alkylation" means that the $X^{\ominus}$ group is not alkylated by the R group at a fast enough rate to prevent isolation of the sulfonate esters as compounds during their preparation. Anionic groups which are halogens such as chlorine and bromine are not within the scope of the present invention and in fact can be isolated only with difficulty since they are alkylated too rapidly by the R group in the sulfonate compounds of the present invention.

The compounds of the present invention are produced by the process which broadly comprises reacting by heating a large molar excess of a symmetrical di-lower alkyl sulfate $((R)_2SO_4)$ with a compound of the structural formula:

$$\overset{\ominus}{O}\overset{O}{\underset{O}{\overset{\uparrow}{S}}}R_1$$

wherein $R_1$ is an organic group containing an amine group to produce a compound of the formula:

$$(R)_n-R_1-\overset{O}{\underset{O}{\overset{\uparrow}{S}}}-O-R$$

wherein $n$ is an integer between 0 and 3.

The compounds of the present invention are produced by a preferred process which comprises reacting a molar excess of a symmetrical di-lower alkyl sulfate with a quaternary amine sultane of the structural formula:

$$^{\oplus}R_1-\overset{O}{\underset{O}{\overset{\uparrow}{S}}}-O^{\ominus}$$

wherein $R_1$ is an organic group containing a quaternary amine cationic group. The specific character of the $R_1$ group is discussed above. The preferred compounds of the present invention are produced by the process which comprises reacting a molar excess of a symmetrical di-lower alkyl sulfate with a quaternary ammonium alkylene sultane of the structural formula:

$$^{\ominus}SO_3Alk-\overset{|}{\underset{|}{N}}^{\oplus}$$

wherein Alk and $$-\overset{|}{\underset{|}{N}}-$$

are as heretofore set forth to produce the compound of the structural formula:

$$RO-\overset{O}{\underset{O}{\overset{\uparrow}{S}}}-Alk-\overset{|}{\underset{|}{N}}^{\oplus}-[SO_4R]^{\ominus}$$

wherein R, Alk and $$\overset{|}{\underset{|}{N}}-$$

are as heretofore set forth.

Alternately, sulfonic acids (or their alkali metals such as sodium, salts) containing an amine group, can also be used to produce the compounds of the present invention by reaction with a lower di-alkyl sulfate. In this process, the dialkyl sulfate introduces alkyl groups into the amine groups as illustrated by the following reactions:

$$(CH_3)_2N\text{-}AlkSO_3H(CH_3O)_2SO_2 \rightarrow$$
$$(CH_3)_3N^{\oplus}\text{-}AlkSO_3CH_3+SO_4^{\ominus}$$

and

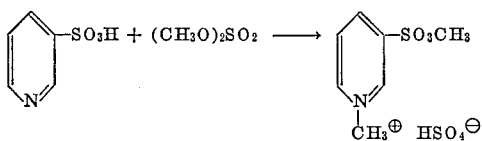

and which follows the generalized reaction:

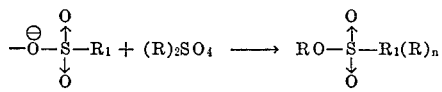

wherein $R_1$ is an organic group containing a primary, secondary or tertiary amine group which is alkylated by the lower alkyl sulfate to convert $R_1$ into a quaternary ammonium group where $n$ is an integer between 1 and 3. Thus as can be seen from the foregoing discussion when $n$ is 0 the sultane is the starting material with a quaternary ammonium amine group and when $n$ is 1 to 3 the starting material is a primary, secondary or tertiary amine as the sulfonic acid or salt.

It should be noted at this point that the compounds of the present invention containing the lower alkyl sulfate anion undergo hydrolysis upon standing to form the bisulfate. The following reaction is illustrative:

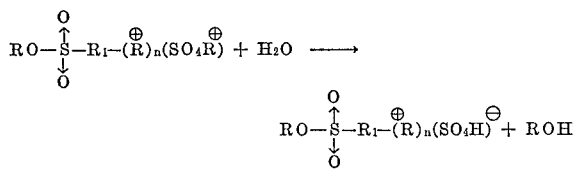

The compounds of the present invention containing the bisulfate anion are stable and can be isolated.

The lower alkyl and quaternary ammonium sulfate substituted sulfonates can be isolated as the sulfates or converted to a compound containing another anionic group resistant to alkylation. The sulfates can be reacted with a base to form a hydroxide and then reacted with an acid containing an anionic group which is resistant to alkylation by the R group to form the product containing such anionic group. However, such reaction must be conducted very rapidly since the hydroxide intermediate is easily and rapidly alkylated by the R group. In order to reduce problems with premature alkylation, ion exchange resins are preferably used to convert the sulfate to another anionic group which is resistant to alkylation. The sulfate is preferably dissolved in a lower alkanol or alkanol and water mixtures, then passed through an ion exchange resin (hydroxide form) column at reduced temperatures then the hydroxide eluate is immediately neutralized with an acid containing the anionic group resistant to alkylation and then the product is precipitated and separated from the lower alkanol as the crystalline product having the structural formula:

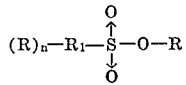

wherein R, $R_1$ and $n$ are as heretofore set forth. The preferred acid is concentrated perchloric acid although concentrated nitric acid and sulfuric acid has been found to be satisfactory. Alternatively, the sulfate can be reacted with an alkali salt containing a salt anion which displaces the sulfate group. It is preferred to use an alkali salt with a metal anion which forms an insoluble sulfate which is precipitated. For this reason, barium perchlorate is preferred.

Illustrative of the process of the present invention and the compounds produced are the following Examples I–XIX. In certain instances, the sultane starting compounds in Examples I–XVII are unknown to the prior art or are obtained with difficulty and the process for the preparation of the sultanes is also shown in the following Examples I–XVII.

EXAMPLE I

3-(trimethylammonium)-propane sulfane

Sixty-one (61) grams (0.5 mole) of 3-hydroxy-1-propane sulfonic acid sultone was added to 30 grams (0.5 mole) of trimethyl amine in benzene with stirring. The heated reaction mixture was maintained at a temperature of 35–40° C. The reaction mixture was then warmed to 50–60° C. for one hour and then allowed to stand over night at room temperature. The reaction mixture was filtered and the wet solid was stirred and heated with 300 ml. of absolute ethanol. The cooled mixture was filtered and the resulting solid crude 3-(trimethylammonium)-propane sultane (84 grams—92% yield) had a melting point of 344–346° C. with decomposition and darkened at 330° C. An additional seven (7) grams was recovered from the mother liquor mixture to increase the yield of crude to about 100%. The product was recrystallized from methanol to give a melting point of 347–349° C. with decomposition. It was found that the melting point varied with the rate of heating.

*Analytical.*—Calculated for $C_6H_{15}NO_3S$ (percent): C, 39.76; H, 8.34; S, 17.69. Found (percent): C, 39.55; H, 8.45; S, 17.49.

Methyl-3-(N-trimethylammonium perchlorate)-propane sulfonate

One and eighty-one hundredths (1.81) grams (0.01 mole) of 3-(trimethylammonium)-propyl sultane was added to 10 ml. of practical grade dimethyl sulfate and heated to reflux. The solution was refluxed for 1–2 hours, cooled and leached with five 20 ml. portions of ether to remove excess dimethyl sulfate and by-product acids. The resulting crude methyl-3-(N-trimethylammonium methyl sulfate) propane sulfonate can be isolated but this step was unnecessary in order to produce the perchlorate product.

The residual semi-solid mass was dissolved in cold methanol and passed over a methanolic (Dowex 1–X2$_{TM}$ hydroxide form) ion exchange resin column surrounded with Dry Ice. The eluate was immediately neutralized with 70% perchloric acid. The crystalline material was filtered, washed with cold methanol and recrystallized from acetone-ether (or acetone-methanol-ether) to yield 2.3 grams in 80% yield of methyl-3-(N-trimethylammonium perchlorate) propane sulfonate with a melting point of 116–118° C.

*Analytical.*—Calculated for $C_7H_{18}ClNO_7S$ (percent): C, 29.43; H, 6.13; N, 4.74; S, 10.48. Found (percent): C, 29.48; H, 6.15; N, 4.56; S, 10.59.

EXAMPLE II

3-(triethylammonium)-propane sultane

A solution of 3 grams of propane sultone and 25 grams of triethyl amine in 300 ml. of benzene was stirred at room temperature for about 12 hours and then refluxed for one hour. The mixture was filtered, washed with benzene and dried to yield 18 grams in 33% yield of the crude sultane product. Recrystallization with absolute ethanol-acetone-ether gave a product melting at 150–152° C. with foaming which then resolidifies and melts at 284–287° C. with decomposition. The first melting point was probably due to solvent of recrystallization. The second recrystallization followed by drying at 100° C. in vacuo gave an analytical sample of the sultane with a melting point of 290–293° C. with decomposition.

*Analytical.*—Calculated for $C_9H_{21}NO_3S$ (percent): C, 48.40; H, 9.48; S, 14.36. Found (percent): C, 48.25; H, 9.73; S, 14.24.

Methyl-3-(N triethylammonium perchlorate)-propane sulfonate

Using the procedure of Example I and 2.23 grams (0.01 mole) of 3-(N triethylammonium)-propane sultane, 1.8 grams of the sulfonate was obtained in 53% yield with a melting point of 86–88° C. after recrystallization from acetone-methanol-ether.

*Analytical.*—Calculated for $C_{10}H_{24}ClNO_7S$ (percent): C, 35.55; H, 7.16; Cl, 10.50; N, 4.15; S, 9.49. Found (percent): C, 35.75; H, 7.10; Cl, 10.55; N, 4.22; S, 9.48.

EXAMPLE III 3-(pyridinium)-propane sultane

A solution of 30 grams (0.025 mole) of propane sultone and 35 ml. of pyridine in 1000 ml. of acetone was allowed to stand at room temperature for 18 hours. A first 20 grams of crude sultane product was removed from the reaction mixture and washed with acetone and had a melting point of 272–274° C. with decomposition. A second 18 grams of sultane was recovered on longer standing. The total yield of sultane was 38 grams in 75% yield. Recrystallization from methanol-ether gave an analytical sample melting point 273–275° C. with decomposition.

*Analytical.*—Calculated for $C_8H_{11}NO_3S$ (percent): C, 47.74; H, 5.51. N, 6.96. S, 15.93. Found (percent): C, 47.60. H, 5.50. N, 7.01; S, 16.14.

Methyl-3-(pyridinium perchlorate)-propane sulfonate

From 5.5 grams of 3-(pyridinium)-propane sultane and using the procedure of Example I, there was obtained 5.3 grams of sulfonate product in 70% yield with a melting point of 117–119° C. Recrystallization from acetone-ether gave an analytical sample with a melting point of 118–120° C.

*Analytical.*—Calculated for $C_9H_{14}ClNO_7S$ (percent): C, 34.23; H, 4.47; N, 4.43; S, 10.15. Found (percent): C, 34.37; H, 4.36; N, 4.39; S, 9.95.

EXAMPLE IV 3-(trimethylammonium)-1,1,3-trimethylpropane sultane

Ten (10) grams (0.061 mole) of a solution of the sultone of 3-hydroxy-1,1,3-trimethylpropane sulfonic acid in 10 grams of trimethylamine was placed in a sealed tube and allowed to stand at room temperature for four days. The tube was opened and most of the excess amine was allowed to evaporate. The solid sultane product was washed with ether to give 4.5 grams and 33% yield of crude product with a melting point of 256–258° C. with the decomposition. Recrystallization from methanol-ether gave an analytical sample of the sultane product with a melting point of 260° C. with decomposition.

*Analytical.*—Calculated for $C_9H_{21}NO_3S$ (percent): C, 48.39; H, 9.48; N, 6.28; S, 14.35. Found (percent): C, 48.25; H, 9.45; N, 6.45; S, 14.38.

Methyl-3-(trimethylammonium perchlorate)-1,1,3-trimethylpropane sulfonate

Using the procedure of Example I, 3 grams (0.13 mole) of 3-(N-trimethylammonium)-1,1,3-trimethylpropane sultane in 18 ml. of trimethylsulfate was heated at 110° C. for 16 hours. The product (2.6 grams) was obtained in 60% yield and had a melting point of 117–118° C. Recrystallization from acetone-ether gave an analytical sample melting point of 117–119° C.

*Analytical.*—Calculated for $C_{10}H_{24}ClNO_7S$ (percent): C, 35.55; H, 7.16; N, 4.14; S, 9.49. Found (percent): C, 35.46; H, 7.40; N, 3.87; S, 9.65.

EXAMPLE V 3-(pyridinium)-1,1,3-trimethylpropane sultane

A solution of 10 grams (0.061 mole) of 3-hydroxy-1,1,3-trimethyl propane sulfonic acid in 25 ml. of pyridine was heated at 90° C. for 2.5 hours. The cooled solution was filtered and the solid washed with ether to yield 15 grams in 62% yield of the crude sultane product with a melting point of 251–253° C. with decomposition. Recrystallization from methanol-ether gave an analytical sample of the sultane product with a melting point of 254–255° C. with decomposition.

*Analytical.*—Calculated for $C_{11}H_{17}NO_3S$ (percent): C, 54.29; H, 7.04; N, 5.76; S, 13.18. Found (percent): C, 53.17; H, 7.09; N, 5.79; S, 13.42.

Methyl-3-(pyridinium perchlorate)-1,1,3-trimethyl propane sulfonate

Using the procedure of Example I, a solution of 2 grams (0.0082 mole) of 3-pyridinium-1,1,3-trimethylpropane sultane in 12 ml. of dimethyl sulfate was refluxed for 2 hours. The sulfonate product (2.2 grams) was obtained in 75% yield and had a melting point of 88–90° C. Recrystallization from acetone-ether gave an analytical sample of the sulfonate product with a melting point of 90–92° C.

*Analytical.*—Calculated for $C_{12}H_{20}ClNO_7S$ (percent): C, 40.28; H, 5.63; N, 3.91; S, 8.99. Found (percent): C, 40.48; H, 5.84; N, 3.96; S 9.02.

EXAMPLE VI 4-(trimethyl ammonium)-butane sultane

A solution of 27.2 grams (0.2 mole) of butane sultone and 17.7 grams (0.3 mole) of triethylamine and 300 ml. of benzene was heated to a gentle reflux. The system was then sealed and then refluxed gently for three days. One-half of the benzene was removed or replaced with acetone. The solid was isolated by filtration and recrystallized from water-ethanol-acetone. The sultane product (29.3 grams) was obtained in 75% yield and had a melting point of 345° C. with decomposition. An analytical sample of the sultane product was obtained by two additional recrystallizations.

*Analytical.*—Calculated for $C_7H_{17}NO_3S$ (percent): C, 43.05; H, 8.78; S, 16.42. Found (percent): C, 42.58; H, 9.06; S, 16.12.

Methyl-4-(N-trimethylammonium perchlorate)-butane sulfonate

Using the procedure of Example I, 1.95 grams (0.01 mole) of 4-(N-trimethylammonium) butane sultane in 18 ml. of dimethyl sulfate was refluxed. The sulfonate product (2.3 grams) was obtained in 74% yield and the recrystallized sulfonate product had a melting point of 90–92° C. Additional recrystallization from acetone-methanol ether raised the melting point to 91–93° C.

*Analytical.*—Calculated for $C_8H_{20}ClNO_7S$ (percent): C, 31.02; H, 6.51; N, 4.52; S, 10.35. Found (percent): C, 31.16; H, 6.53; N, 4.59; S, 10.38.

EXAMPLE VII 4-(triethylammonium)-butane sultane

Thirteen and six tenths (13.6) grams (0.1 mole) of butane sultone was added to 30.3 grams (0.3 mole) of triethyl amine and the heterogenous mixture was stirred at room temperature for four days and then allowed to stand for one week without stirring. Excess amine was decanted and the solid was washed with ether, dissolved in methanol and passed over a Dowex 1–X2$_{TM}$ hydroxide form column. The eluate was concentrated to a small volume and the residual solid was recrystallized, from absolute ethanol-acetone ether. The sultane product was collected in three portions to yield a total of 12.4 grams in 52% yield with a melting point of 296–298° C. with decomposition. Recrystallization gave an analytical sample of the sultane product with a melting point of 298–299° C.

*Analytical.*—Calculated for $C_{10}H_{23}NO_3S$ (percent): C, 50.60; H, 9.77; S, 13.51. Found (percent): C, 50.30; H, 9.84; S, 13.84.

Methyl-4-(N-triethylammonium perchlorate)-butane sulfonate

Using the procedure of Example I, 2.3 grams (0.01 mole) of 4-(N-triethylammonium) butane sultane was reacted with dimethyl sulfate. The sulfonate product (2.82 grams) was obtained in 80% yield after recrystallization from warm methanol and contained traces of acetone.

The product had a melting point of 74–77° C. An analytical sample of the sulfonate product was obtained after two additional recrystallizations and the melting point was unchanged.

*Analytical.*—Calculated for $C_{11}H_{26}ClNO_7S$ (percent): C, 37.55; H, 7.45; Cl, 10.08; S, 9.11. Found (percent): C, 37.81; H, 7.46; Cl, 19.26; S, 8.95.

EXAMPLE VIII 4-(pyridinium)-butane sultane

A solution of 9.0 grams (0.066 mole) of butane sultone and 25 ml. of pyridine in 25 ml. of acetone was heated on a steam bath for three hours. The solid which separated was removed by filtration and the mother liquor was heated for an additional five hours and then cooled to precipitate more product. From both steps there was isolated 6.1 grams of crude sultane product in 43% yield with a melting point of 229–231° C. with decomposition. Recrystallization from methanol-ether gave an analytical sample of sultane product with a melting point of 231° C. with decomposition and foaming.

*Analytical.*—Calculated for $C_9H_{13}NO_3S$ (percent): C, 50.17; H, 6.08; N, 6.51; S, 14.89. Found (percent): C, 50.21; H, 6.13; N, 6.51; S, 15.09.

Methyl-4-(pyridinium perchlorate)-butane sulfonate

Using the procedure of Example I, one (1) gram of 4-(pyridinium) butane sultane was reacted with dimethyl sulfate. The yield was 0.99 gram in 65% yield of crude sulfonate product with a melting point of 84–86° C. Recrystallization from acetone-ether gave an analytical sample of the sulfonate product with a melting point of 86–87° C.

*Analytical.*—Calculated for $C_{10}H_{16}ClNO_7S$ (percent): C, 36.41; H, 4.88; N, 4.24; S, 9.72. Found (percent): C, 36.66; H, 5.02; N, 4.22; S, 9.80.

EXAMPLE IX 2-(trimethylammonium) ethane sultane

Anhydrous trimethyl amine 2.95 grams (0.05 mole) was dissolved in ethylene dibromide 95 grams (0.5 mole) and the solution was allowed to stand at room temperature for four days. Excess ethylene dibromide was removed in vacuo. The residue was washed with ethyl acetate and dried to give 14.4 grams (100% yield) of 2-bromo ethane trimethyl ammonium bromide with a melting point of 239–240° C.

Method 1: Twelve and thirty-five one hundredths (12.35) grams (0.5 mole) 2-bromoethane trimethylammonium bromide and 6.615 grams (0.05 mole) of sodium sulfite and 40 ml. of water was heated at 85–90° C. for seven hours. Water was removed in vacuo and the solid residue triturated with concentrated hydrochloric acid and filtered through a sintered glass funnel. Absolute alcohol was added and the resulting solid sultane product was filtered and recrystallized from water-ethanol. The sultane product (7.45 grams) was obtained in 89% yield and had a melting point of 343–345° C.

Method 2: The sodium salt of 2-bromoethane sulfonic acid was dissolved in 900 ml. of 25% aqueous trimethyl amine and held at room temperature for ten days. This solution was concentrated to near dryness diluted with absolute ethanol and filtered. The solid was triturated with 65 ml. of concentrated hydrochloric acid, filtered and the filtrate concentrated to a thick syrup. Methanol and isopropanol were added to this syrup and the resulting solid collected on a filter. The solid was dissolved in water and passed through a column of Dowex 50 X2$_{TM}$ in water. The solution was again concentrated to near dryness. Absolute ethanol was added and the resulting solid sultane product collected on a filter. The sultane product was recrystallized in methanol-water to yield 7.44 grams in 66% yield with a melting point of 344–346° C.

Methyl-2-(N-trimethylammonium perchlorate)-ethane sulfonate

Method 1: eighty-four hundredths (0.84) grams (0.005 mole) 2-(N-trimethylammonium ethane sultane was refluxed in 5 ml. of dimethyl sulfate for one hour. After leaching with ether, the residual slightly gummy solid was dissolved in methanol, treated with charcoal and then passed over two Dowex 1–X2$_{TM}$ columns (perchlorate form) resin columns (1.3 by 40 centimeters). The solution was concentrated in the cold and the solid filtered and recrystallized twice from acetone-ether to yield 0.32 gram in 23% yield of the sulfonate product with a melting point of 136–147° C.

Method 2: In this procedure, the residual solid from the dimethyl sulfate reaction in Method 1 of this Example IX was washed with a small volume of ice cold methanol, then dissolved in methanol and treated with a methanol solution of anhydrous barium perchlorate at room temperature. The reaction mixture was cooled to 0° C. and the solid crude product was washed with cold methanol. After recrystallization from acetone-ether the sulfonate product had a melting point of 145–146.5° C. The overall yield by this procedure was 40–50%.

*Analytical.*—Calculated for $C_6H_{16}ClNO_7S$ (percent): C, 25.58; H, 5.73; Cl, 12.58; N, 4.97; S, 11.38. Found (percent): C, 25.84; H, 5.76; Cl, 12.54; N, 4.96; S, 11.20.

EXAMPLE X

Methyl-3-(N-trimethylammonium nitrate) propane sulfonate

The identical procedure of Example I for the perchlorate salt was utilized except that the eluate from the Dowex$_{TM}$ column was neutralized with concentrated nitric acid instead of perchloric acid. The methanol solution was concentrated in the cold to a small volume, cooled in Dry Ice and scratched to induce crystallization. The initial sulfonate product was cyrstallized to give the sulfonate product with a melting point of 85° C. with foaming. The sulfonate product resolidifies and melts at 344–346° C. with decomposition.

EXAMPLE XI

Methyl-3-(N-pyridinium nitrate) propane sulfonate

This product was prepared in the same manner as Example X and had a melting point of about 72–75° C.

EXAMPLE XII

Methyl-2-(N-trimethylammonium nitrate) ethane sulfonate

This product was prepared in the manner of Example IX, using the procedure of Example X. The sulfonate product was obtained at a low yield. The compound does have a visible melting point until the melting point of the parent sultane is reached. If the melting point capillary tube is inserted in the bath at 220° C. foaming and resolidification can be observed. The product possessed the characteristic nitrate and sulfonate bands in the infrared spectrum.

It might be noted that the sulfonate nitrate salts of Examples X to XII are unstable and revert to the parent sultane on standing, presumably by internal alkylation of the nitrate ion. For this reason, the sulfonate perchlorate salts of Examples I to IX, inclusive, are preferred because of the resistance of the anionic perchlorate ion to alkylation.

EXAMPLE XIII 6-chloro-1-hexanol (25 grams) was treated with 100 grams of trimethyl amine dissolved in 100 ml. of benzene at room temperature for 14 days. The solid 6-trimethylammonium hexanol which precipitated was filtered to give 10.2 grams of a white hygroscopic solid. This material was not further purified but was used directly in the next reaction.

Ten (10) grams of 6-trimethylammonium hexanol was dissolved in 20 ml. of cold thionyl chloride. This solution was allowed to stand for about 12 hours and then refluxed for two hours on a steam bath. Excess thionyl chloride was removed under reduced pressure. The residual gum was dissolved in benzene and diluted with methanol. The solution was decolorized with charcoal and again concentrated to a gum. On standing overnight the gum partially crystallized. A sample of the gum was analyzed for total chloride. The calculated carbon analysis for 1-(N-trimethylammonium)-6-chloro hexane was 33.1% and 30.5% was found.

The crude gum, without further purification, was treated with a solution of 6.2 grams of sodium sulfite and 60 ml. of water at 100° C. for eight hours (oil bath). The solution was concentrated under reduced pressure, followed by azeotroping with absolute ethanol. The solid residue was extracted above 80 ml. of hot absolute ethanol decolorized and diluted with acetone. On standing, 5.5 grams of 6-(trimethylammonium) hexane sultane with a melting point of 354–356° C. with decomposition was obtained. The mother liquor yielded an additional 1.7 grams of product. A methanol water solution of the combined crude solids was passed successively over Dowex 1$_{TM}$ (hydroxide) and Dowex 150$_{TM}$ (acid). The eluate was taken to dryness and the solid residue crystallized from methanol-acetone to yield 3.3 grams of 6-(trimethylammonium) hexane sultane with a melting point of about 367° C. with decomposition. The yield was 38%.

6-(trimethylammonium perchlorate) hexane sulfonate

The 6-(trimethylammonium)-hexane sultane was heated to a reflux with 10 ml. of dimethylsulfate for one hour. Using the procedure of Example I, 2.65 grams in 78% yield of methyl-6-(N-trimethylammonium perchlorate) hexane sulfonate with a melting point of 74–76° C. was obtained. The NMR spectrum was consistent with the assigned structure.

EXAMPLE XIV 4-(N-pyridinium)-4-ethylbutane sultane

This compound was prepared by the method of Burckhardt, Helferich and Bollert, Chem. Ber. 94 505 (1961) with a boiling point at 11 mm. of Hg. of 102–105° C. The 4-ethyl-butane sultone 1.2 grams was heated in pyridine at 80–85° C. for 35 hours. Pyridine was removed under reduced pressure followed by azeotroping with benzene. The crude hygroscopic solid melted at 249–251° C., weighed 1.0 gram and the yield was 72%. After recrystallization from ethanol-ether an analytical sample of 4-(N-pyridinium)-4-ethyl butane sultane was obtained with a melting point of 253–255° C.

Analytical.—Calculated for $C_{11}H_{17}NO_3S$ (percent): C, 54.32; H, 6.99; N, 5.76. Found (percent): C, 54.44; H, 7.05; N, 5.69.

Methyl-4-(pyridinium perchlorate)-4-ethylbutane sulfonate

One (1.0) gram of 4-(N-pyridinium)-4-ethyl butane sultane was converted, using the procedure of Example I, to the desired methyl-4-(pyridinium perchlorate)-4-ethylbutane sulfonate (1.1 grams) in 77% yield and had a melting point of 81–83° C. after recrystallization from methanol.

Analytical.—Calculated for $C_{12}H_{20}ClNO_7S$ (percent): C, 40.28; H, 5.63; N, 3.91. Found (percent): C, 40.43; H, 5.71; N, 4.04.

EXAMPLE XV

Methyl-4-(trimethylammonium)-4-ethylbutane sultane 4-ethylbutane sultone (1.0 gram) was heated in an anhydrous triethyl amine at 100–105° C. for 12 hours in a sealed tube. The excess trimethyl amine was removed from the crude solid. The crude solid sultane product weighed 200 mg. and was recrystallized from ethanol-ether to get 100 mg. in 8% yield of 4-(trimethylammonium)-4-ethylbutane sultane with a melting point of 238–240° C.

4-(trimethylammonium perchlorate)-4-ethylbutane sulfonate

Using the procedure of Example I, the 4-(trimethylammonium)-4-ethylbutane sultane was refluxed by 1.5 hours with dimethyl sulfate. The sulfonate product (105 mg.) was obtained in 63% yield and had a melting point of 94–97° C.

EXAMPLE XVI

Method 1—N-methyl-3-pyridine sultane: Two (2) grams of pyridine-3-sulfonic acid was heated at 160–170° C. with 20 ml. of dimethyl sulfate for 20 hours. The cooled reaction mixture was poured into excess ether and the mixture was filtered. The solid was worked with ether and recrystallized from methanol-water to yield 1.85 grams in 85% yield of N-methyl-3-pyridine sultane.

Analytical.—Calculated for $C_6H_7NO_3S$ (percent): C, 41.61; H, 4.07; N, 8.09. Found (percent): C, 41.77; H, 4.33; N, 8.19.

3-(methyl sulfonate)-pyridine methyl perchlorate

The N-methyl-3-pyridine sultane (200 mg.) was heated with 2 ml. of dimethyl sulfate at 180° C. for 24 hours. The solution was triturated with ether. The residual solid was dissolved in a minimum quantity of water, diluted with an equal volume of methanol and the solution was passed over a Dry Ice cooled column of Dowex-1$_{TM}$ (hydroxide form). The eluate was neutralized with 75% perchloric acid and the solution was cooled in a Dry Ice-acetone bath. The precipitated solution was triturated with acetone and filtered to remove the starting material. The product 3-(methylsulfonate)-pyridine methyl perchlorate was precipitated from the filtrate with ether to yield 15 mg. at 4% yield with a melting point of 113–114° C., with softening at 105° C.

Method 2: Two hundred (200) milligrams of 3-pyridine sulfonic acid and 2 ml. of dimethyl sulfate were heated in an oil bath at 170–180° C. for two hours. Using Method 1 of this Example XVI, the product was obtained (60 mg. and in 16% yield), with a melting point of 113.5–115° C.

Analytical.—Calculated for $C_7H_{10}ClNO_7S$ (percent): C, 29.2; H, 3.50; N, 4.87; S, 11.15. Found (percent): C, 29.13; H, 3.52; N, 5.31; S, 10.99.

EXAMPLE XVII

Ethyl-3-(N-trimethylammonium perchlorate)-propane sulfonate

One gram of 3-(trimethylammonium)-propane sultane (Example I) and eight ml. of diethylsulfate were heated for four hours at 160° C. The reaction mass was extracted with ether and the residue dissolved in methanol. The solution was passed over Dowex-1$_{TM}$ (hydroxide) ion exchange resin. The eluate was passed into 30 ml. of ether containing one ml. of perchloric acid also cooled to −70° Additional ether was added until precipitation was complete. The crude product, 1.36 g., was collected and washed with ether, dissolved in acetone, decolorized, and ether was added to recrystallize the product. There was obtained 1.12 g. (2 crops), M.P. 94–96° (65%). An analytical sample melted at 95.5–96.5°.

Analytical.—Calculated for $C_8H_{20}ClNO_7S$ (percent): C, 31.02; H, 6.50; N, 4.52; S, 10.35. Found (percent): C, 31.33; H, 6.48; N, 4.53; S, 10.37.

EXAMPLE XVIII 3-(methylsulfonate)-pyridine methoperchlorate

The preparation of the subject compound was extensively studied to both improve the yield (10–16%) and ease of processing by the use of barium perchlorate to convert the product from the dimethylsulfate reaction to the perchlorate salt.

Standard conditions were established for the reaction with dimethylsulfate in which one gram of available 3-pyridine sulfonic acid was heated for six hours with 10 ml. of dimethylsulfate at 180° C. slightly below reflux. Excess dimethylsulfate was removed by extraction with anhydrous ether. (Removal and recycling of the dimethylsulfate by reduced pressure distillation would be feasible.) The dark brown syrupy residue, which contained the product in form of the methyl sulfate salt, was dissolved in 25 ml. of anhydrous acetone per gram of starting material. A solution of barium perchlorate in acetone, about 65 g. per liter, was prepared separately and filtered. The barium perchlorate solution (0.35 mole of barium perchlorate per mole of starting material) was then added to the acetone solution of the reaction mixture and finely divided barium sulfate (possibly some barium methylsulfate is present) precipitated at once. A little decolorizing carbon was added and the precipitate and carbon were removed by filtration through a filter aid. Anhydrous ether was then slowly added to the filtrate with swirling to a slight turbidity to induce initial crystal formation. When precipitation was complete, the mixture was cooled to 5° with further additions of ether as required. Usually about two volumes of ether per volume of acetone were required. The slightly yellow to white product ester was then removed by filtration and washed with dry ether. The crude product melted at about 111–113° C. The product was recrystallized once in the same manner (anhydrous solvents) to give a product melting at 114–115° C. The recovery was about 90%. The overall yield of recrystallized product was about 20% based on 3-pyridine-sulfonic acid. This corresponded to a weight yield of 37% i.e. 3.7 g. of product from 10 g. of sulfonic acid.

EXAMPLE XIX 3-(ethylsulfonate)-pyridine methoperchlorate

Five grams of 3-pyridine sulfonic acid and 100 ml. of diethylsulfate were heated rapidly to reflux (200–210° C.) under a nitrogen atmosphere. The mixture was held at reflux for not more than 10 minutes and then cooled. The reaction mixture was leached with ether and the residue dissolved in methanol. The methanolic solution was passed over a Dowex–1$_{TM}$ (hydroxide) ion exchange resin column at $-70°$ C. The eluate was passed directly into 100 ml. of ether containing 2 ml. of perchloric acid, also cooled to $-70°$ C. More ether was added until precipitation was complete. The product was filtered, worked with ether and recrystallized from acetone-ether. There was obtained, typically, 2.8 g. (30%) of the ethyl ester product, M.P. 94.5–96.5°.

*Analytical.*—Calculated for $C_9H_{14}ClNO_7S$ (percent): 34.29; H, 4.44; N, 4.44; S, 10.16. Found (percent): C, 34.38; H, 4.60; N, 4.42; S, 10.18.

As can be seen from the foregoing Examples I–XIX, there can be a great number of $R_1$ groups which are suitable to produce the compounds of the present invention. The specific structure of the $R_1$ group is not critical so long as it contains an amine group.

The sultane starting compounds of the present invention are obtained by the procedures of Examples I–XVII. In particular, any of the methods of Examples I, II, IX or XVI can be utilized. In Example I, a hydroxy sulfonic acid is reacted with a tertiary amine to produce the sultane. Another method, as shown in Example II is to react a sultone with a tertiary amine to produce the sultane. In Example IX, Method 1, an organic dihalide is reacted with a tertiary amine to produce a halo quaternary ammonium halide salt. This product is reacted with an alkali metal sulfite to produce the corresponding sultane. An alternate procedure is to react a halo sulfonic acid as the acid or alkali salt with the quaternary ammonium compound to produce the corresponding sultane as shown in Method 2 of Example IX. In Example XVI, a tertiary amine sulfonic acid is reacted with a di-lower alkyl sulfate or halide alkylating agent to produce the sultane. Using any of these methods, the corresponding sultane is easily obtained.

In the foregoing examples, I–XVI, the R group is methyl because of the use of dimethyl sulfate. However, it will be appreciated that other symmetrical substituted or unsubstituted di-lower alkyl sulfates such as diethyl sulfate as in Examples XVII and XIX can be utilized in the present invention without varying hte results. The specific character of the R group will depend upon the R group desired to be introduced into a given molecule.

The alkylating agents of the present invention are soluble in water. They can be used in acidic or neutral solutions and in basic environments when the basicity is present because of the material to be alkylated, for instance, amines. The flexibility of the compounds of the present invention in this respect is a distinct advantage. They can be used for alkylation in various polar solvents if desired including lower alkanols, cyclic ethers and ketones, and the like. The alkylating agents of the present invention are reactive enough to alkylate certain of these polar solvents particularly alkanols, but in general they react much more slowly than the molecule being alkylated and useful reactions can easily be conducted in the polar solvents with minimum loss by alkylation through solvolysis.

Illustrative of the alkylation reactions using the compounds of the present invention are the following reactions:

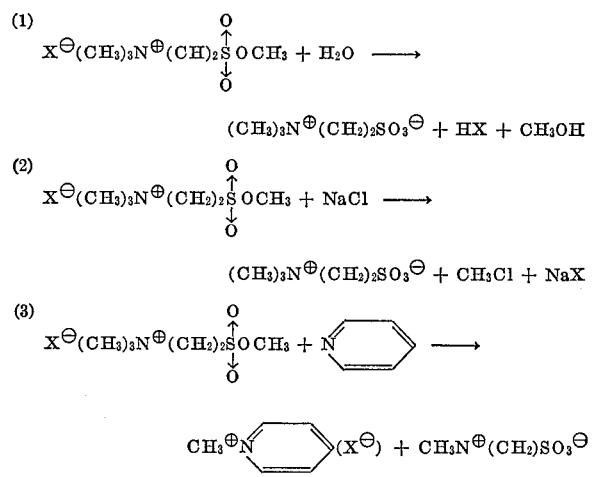

Other examples which illustrate the broad scope of the invention include:

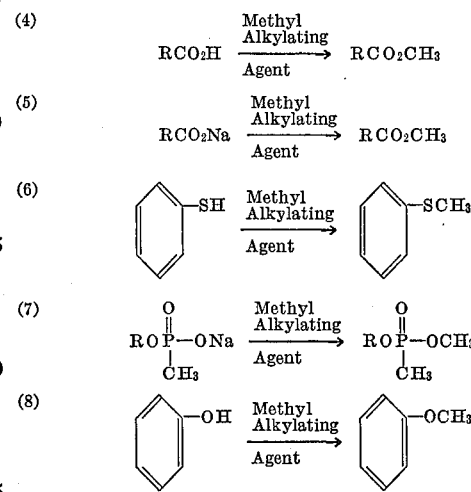

(9) 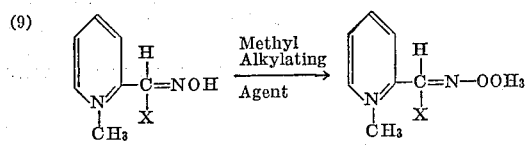

(10) ROH $\xrightarrow{\text{Ethyl Alkylating Agent}}$ ROC$_2$H$_5$

As will be seen from the foregoing reactions the stable, water soluble sultane is a product of the reaction. It is possible to isolate this compound from the solution and using the procedures of Examples I–XVII to again produce the sulfonates of the present invention. This represents a considerable economy in the utilization of the compounds of the present invention as alkylating agents.

It is intended that the foregoing description be only illustrative of the present invention and that this invention be limited only by the hereinafter appended claims.

We claim:

1. In the process for the preparation of a sulfonate of the structural formula:

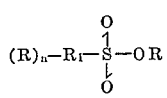

wherein R is a lower alkyl group, wherein $n$ is an integer between 0 and 3 and wherein R$_1$ is a quaternary amine cationic group with the (R)$_n$ groups attached to the amine group and contains 1 to 8 carbon atoms between the sulfur atom and the quaternary amine cationic group in ionic association with an anionic group selected from sulfate, lower alkyl sulfate and bisulfate and anionic groups which displace these groups and which are resistant to alkylation by the R group, the step which comprises:

reacting by heating a large molar excess of a symmetrical di-lower alkyl sulfate (R)$_2$SO$_4$ with a compound selected from quaternary ammonium sultanes and primary, secondary and tertiary amine sulfonic acids and alkali metal salts thereof of the structural formula:

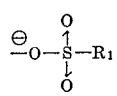

wherein R$_1$ is the amine group which forms an anionic sulfate group selected from sulfate, bisulfate and lower alkyl sulfate groups in ionic association with a quaternary ammonium group upon reaction with the di-lower alkyl sulfate to produce a compound of the structural formula:

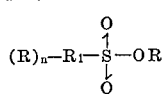

wherein $n$, R and R$_1$ are as defined above containing the anionic sulfate group.

2. The process of claim 1 wherein $n$ is zero and wherein the starting compound is a quaternary ammonium sultane of the structural formula:

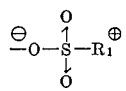

3. The process of claim 2 wherein the R$_1$ group has the structural formula:

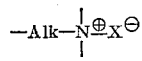

wherein

is a cationic quaternary amine group, selected from tri-lower alkyl ammonium groups wherein Alk is a lower al-kylene group, and wherein X$^\ominus$ is the anionic lower alkyl sulfate group and wherein the sultane has the structural formula:

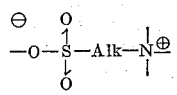

wherein

and Alk are as previously defined.

4. The process of claim 1 wherein the di-lower alkyl sulfate is dimethyl sulfate.

5. The process of claim 4 wherein in addition excess dimethyl sulfate is removed by leaching the product with diethyl ether.

6. The process of claim 5 wherein in addition the product is dissolved in a lower alkanol and passed through an ion exchange resin column at reduced temperatures to form the hydroxide by displacement of the lower alkyl sulfate group, then neutralized with an acid selected from the group consisting of sulfuric, nitric and perchloric acids and then precipitated and separated from the lower alkanol as a crystalline product having the structural formula:

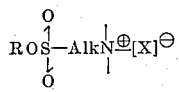

wherein R, Alk and

are as heretofore defined and wherein X$^\ominus$ is the anionic group selected from sulfate, perchlorate and nitrate groups.

7. The process of claim 6 wherein the acid is concentrated perchloric acid.

8. The process of claim 7 wherein the product is recrystallized from a solvent.

9. The process of claim 1 wherein in addition the excess di-lower alkyl sulfate is removed from the product, then converted from a sulfate to a hydroxide by reaction with a base and then the hydroxide is reacted with an acid selected from the group consisting of nitric, sulfuric and perchloric acids.

10. The process of claim 1 wherein in addition the sulfate is reacted with an alkali salt to form the corresponding sulfonate containing the anionic group from the salt, the anionic group of the salt being resistant to alkylation by the R group.

11. The process of claim 1 wherein the

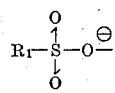

group is selected from the sulfonic acids and alkali metal salts and has the structural formula:

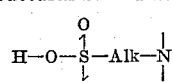

wherein

is the amine group selected from the group consisting of primary, secondary and tertiary amines and Alk is a lower alkylene group.

12. The process of claim 1 wherein $n$ is 1, wherein the $R_1$ group has the structural formula:

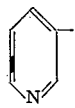

13. In the process for the preparation of the sulfonate of the structural formula:

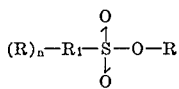

wherein R is a lower alkyl group wherein $n$ is an integer between 0 and 3 and wherein $R_1$ is a quaternary ammonium cationic group with the $(R)_n$ groups attached to the amine group and contains 1 to 8 carbon atoms between the sulfur atom and the quaternary amine cationic group in ionic association with an anionic group selected from sulfate, nitrate and perchlorate, the step which comprises:

reacting a compound of the structural formula:

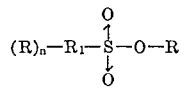

wherein $n$, R, and $R_1$ are as previously defined in ionic association with an anionic group selected from sulfate, bisulfate and lower alkyl sulfate groups with a base which converts the sulfate to a hydroxide and then immediately neutralizing the hydroxide with an acid selected from the group consisting of nitric, sulfuric and perchloric acids.

14. The process of claim 13 wherein the $R_1$ group has the structural formula:

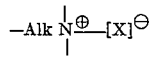

wherein Alk is a lower alkylene group and wherein

is a cationic quaternary amine group selected from tri lower alkyl ammonium groups and wherein $X^\ominus$ is the anionic group selected from perchlorate and nitrate groups.

15. The process of claim 13 wherein the base is a methanolic ion exchange resin and wherein the acid is concentrated perchloric acid and wherein the product is a perchlorate.

16. In the process for the preparation of the sulfonate of the structural formula:

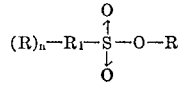

wherein R is a lower alkyl group, wherein $n$ is an integer between 0 and 3 and wherein $R_1$ is a quaternary ammethanolic ion exchange resin and wherein the acid is to the amine group and contains 1 to 8 carbon atoms between the sulfur atom and the quaternary amine group in ionic association with an anionic group which is a perchlorate, the step which comprises:

reacting a compound of the structural formula:

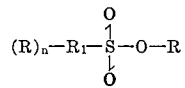

wherein R, $R_1$ and $n$ are as previously defined in ionic association with an anionic group selected from sulfate, bisulfate and lower alkyl sulfate groups with an alkali salt to form the corresponding sulfonate of this salt, the anionic group of the salt being a perchlorate.

17. The process of claim 16 wherein the alkali metal salt is barium perchlorate.

References Cited

Distler et al.: Chem. Abstracts, vol. 61, par. 11933 (1964).

ALAN L. ROTMAN, Primary Examiner

U.S. Cl. X.R.

260—456, 567.6

UNITED STATES PATENT OFFICE
CERTIFICATE OF CORRECTION

Patent No. 3,522,261    Dated July 28, 1970

Inventor(s) Calvin L. Stevens et al.

It is certified that error appears in the above-identified patent and that said Letters Patent are hereby corrected as shown below:

Column 1, line 51 "whch" should read -- which --.

line 63 "resistant to alkylation by the R group" should read -- provide novel sulfonate compounds --.

Column 2, line 65 the formula $-\overset{\oplus}{N}-$ should read $-\overset{\oplus}{\underset{|}{N}}-$.

Column 9, line 42, "95" should read -- 94 --.

Column 12, line 46, "29.2" should read -- 29.22 --.

Column 15, line 1 in the second formula " $-OOH_3$ " should read -- $-OCH_3$ --.

Column 18, line 17 "methanolic ion exchange resin and wherein the acid is" should read -- -monium cationic group with the $(R)_n$ groups attached --.

SIGNED AND SEALED
OCT 27 1970

(SEAL)
Attest:

Edward M. Fletcher, Jr.
Attesting Officer

WILLIAM E. SCHUYLER, JR.
Commissioner of Patents